US012691577B2

(12) United States Patent
Okamoto

(10) Patent No.: US 12,691,577 B2
(45) Date of Patent: Jul. 28, 2026

(54) ROBOT CONTROL DEVICE AND ARTICULATED ROBOT

(71) Applicant: FANUC CORPORATION, Minamitsuru (JP)

(72) Inventor: Takahiro Okamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 73 days.

(21) Appl. No.: 18/834,845

(22) PCT Filed: Feb. 28, 2022

(86) PCT No.: PCT/JP2022/008295
§ 371 (c)(1),
(2) Date: Jul. 31, 2024

(87) PCT Pub. No.: WO2023/162225
PCT Pub. Date: Aug. 31, 2023

(65) Prior Publication Data
US 2025/0196337 A1 Jun. 19, 2025

(51) Int. Cl.
*B25J 9/16* (2006.01)

(52) U.S. Cl.
CPC ..................................... *B25J 9/163* (2013.01)

(58) Field of Classification Search
CPC . B25J 9/163; B25J 9/0018; B25J 9/044; B25J 9/1664; B25J 9/043; B25J 9/1615; B25J 9/1628; B25J 9/1656; B25J 9/1666; B25J 9/1671; B25J 9/1676; G05B 19/42; G05B 2219/39257; G05B 2219/40333;
(Continued)

(56) References Cited

U.S. PATENT DOCUMENTS

2003/0171847 A1* 9/2003 Cheng ................ G05B 19/4103
318/568.11
2013/0338827 A1* 12/2013 One ..................... G05B 19/423
901/41
(Continued)

FOREIGN PATENT DOCUMENTS

JP         H02-218569 A      8/1990
JP         H08-194513 A      7/1996
(Continued)

*Primary Examiner* — Esvinder Singh
(74) *Attorney, Agent, or Firm* — Renner, Otto, Boisselle & Sklar, LLP

(57) ABSTRACT

A robot control device configured such that a storage unit stores a parameter defining a predetermined area near a singular point of a robot. In the robot control device, a processor receives a first teaching point and a second teaching point for robot operation and a type of interpolation between the teaching points, and automatically uses multi-axis interpolation operation different from linear interpolation for at least a part of interpolation operation between the first teaching point and the second teaching point when the type of interpolation is the linear interpolation and also when there is a teaching in which a predetermined position of a distal end of the second arm passes through the predetermined area during movement of the robot under the linear interpolation from the first teaching point to the second teaching point and therefore the teaching is subject to a change.

10 Claims, 12 Drawing Sheets

(58) Field of Classification Search
    CPC ........... G05B 2219/40331; G05B 2219/40354;
                G05B 2219/40289; G05B 2219/40301;
                G05B 2219/23117; G05B 2219/34149;
                G05B 2219/34152; G05B 2219/34153;
                G05B 2219/34173; G05B 2219/36458;
                G05B 2219/42207; G05B 2219/49199
    See application file for complete search history.

(56)                   References Cited

U.S. PATENT DOCUMENTS

| | | | |
|---|---|---|---|
| 2018/0231965 A1* | 8/2018 | Onoyama | ............ G05B 19/423 |
| 2020/0238515 A1* | 7/2020 | Goto | ...................... B25J 9/1633 |

FOREIGN PATENT DOCUMENTS

| | | | |
|---|---|---|---|
| JP | H09-265313 A | | 10/1997 |
| JP | H11-245184 A | | 9/1999 |
| JP | 2003-31166 A | | 11/2003 |
| JP | 2003311664 A | * | 11/2003 |
| JP | 2005246547 A | | 9/2005 |
| JP | 2008-137143 A | | 6/2008 |
| JP | 2015-030078 A | | 2/2015 |
| JP | 2015098076 A | * | 5/2015 |
| JP | 2021-062445 A | | 4/2021 |
| WO | 2020138017 A1 | | 7/2020 |

* cited by examiner

ROBOT CONTROL DEVICE AND ARTICULATED ROBOT

RELATED APPLICATION DATA

This application is a national phase of International Application No. PCT/JP2022/008295 filed Feb. 28, 2022, which is incorporated herein by reference in its entirety.

TECHNICAL FIELD

The present invention relates to robot control devices and articulated robots.

BACKGROUND ART

A known robot control device is provided for improving the behavior of a six-axis vertical articulated robot when it passes through a singular point. The six-axis vertical articulated robot has a first arm member (rotating body) that rotates around a vertical axis and a second arm member that rotates around a horizontal axis relative to the first arm member. The robot control device performs a robot-posture calculation process for calculating the posture of the vertical articulated robot between a certain teaching point and a subsequent teaching point and a determination process for determining whether or not each calculated robot posture passes through the singular point. If it is determined that the robot posture passes through the singular point, the robot control device performs a process for avoiding the passing. For example, see PTL 1.

Another known robot control device is provided for improving the behavior of a six-axis vertical articulated robot when it passes through a singular point. The six-axis vertical articulated robot has a first arm member (rotating body) that rotates around a vertical axis and a second arm member that rotates around a horizontal axis relative to the first arm member. When there is teaching that involves passing near the singular point, the robot control device performs a process for notifying a user of the situation, a process for receiving a desired avoidance operation from the user, and a process for changing the movement of the robot based on the desired avoidance operation received from the user. For example, see Patent Literature 2.

CITATION LIST

Patent Literature

{PTL 1}
  Japanese Unexamined Patent Application Publication No.
    2008-137143
{PTL 2}
  Japanese Unexamined Patent Application Publication No.
    2021-062445

SUMMARY

A robot control device according to a first aspect of the present invention includes a processor and a storage unit, the robot control device controlling a horizontal articulated robot having a first arm supported by a base and a second arm supported by the first arm, wherein the storage unit stores a parameter defining a predetermined area near a singular point of the horizontal articulated robot, wherein the processor is configured to perform: a first teaching point process that receives a first teaching point for movement of the horizontal articulated robot; a second teaching point process that receives a second teaching point serving as a passing point after the first teaching point; an interpolation type process that receives an interpolation type to be applied between the first teaching point and the second teaching point; and an interpolation changing process that automatically uses multi-axis interpolation operation different from linear interpolation for at least a part of interpolation operation between the first teaching point and the second teaching point when the interpolation type is the linear interpolation and also when there is a teaching in which a predetermined position of a distal end of the second arm passes through the predetermined area during movement of the horizontal articulated robot in accordance with the linear interpolation from the first teaching point to the second teaching point and therefore the teaching is subject to a change.

An articulated robot according to a second aspect of the present invention includes: a first arm having a proximal end supported by a base to be rotatable around a first axis; a second arm supported by a distal end of the first arm to be rotatable around a second axis parallel to the first axis; and a robot control device configured to control a rotational position of the first arm around the first axis and a rotational position of the second arm around the second axis, wherein a storage unit of the robot control device stores a parameter defining a predetermined area near a singular point of the articulated robot, wherein a processor of the robot control device is configured to perform: a first teaching point process that receives a first teaching point; a second teaching point process that receives a second teaching point serving as a passing point after the first teaching point; an interpolation type process that receives an interpolation type to be applied between the first teaching point and the second teaching point; and an interpolation changing process that automatically uses multi-axis interpolation operation different from linear interpolation for at least a part of interpolation operation between the first teaching point and the second teaching point when the interpolation type is the linear interpolation and also when there is a teaching in which a predetermined position of a distal end of the second arm passes through the predetermined area during movement of the horizontal articulated robot in accordance with the linear interpolation from the first teaching point to the second teaching point and therefore the teaching is subject to a change.

DESCRIPTION OF EMBODIMENTS

Figure 1:
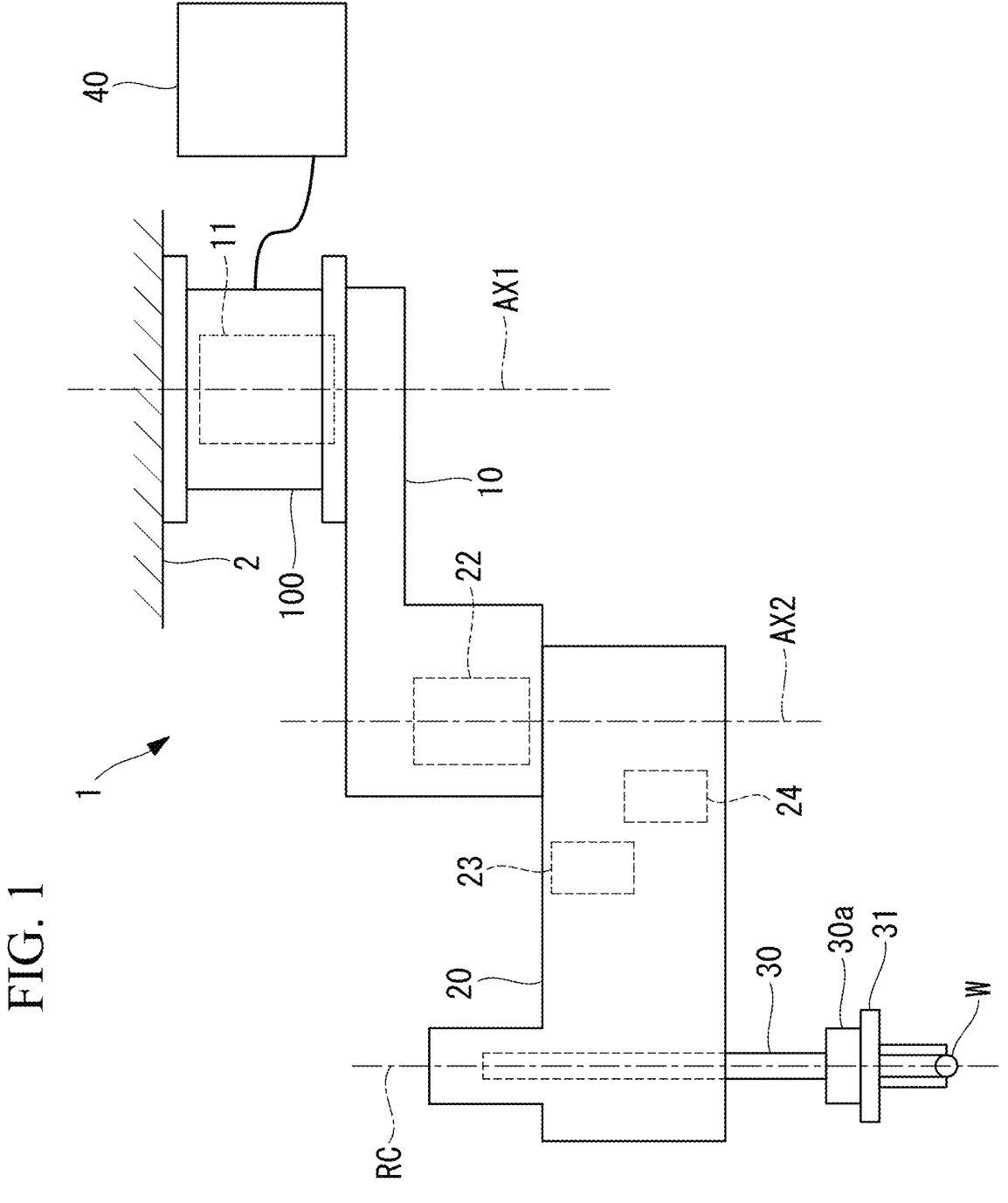
FIG. 1 is a side view schematically illustrating an articulated robot according to a first embodiment.

A robot control device does not perform any process when there is no situation passing through a singular point. However, in a robot in which the rotation axis of the first arm member and the rotation axis of the second arm member are parallel to each other, even when there is teaching that does not pass through the singular point, it is desirable to improve the robot behavior while also taking into account user friendliness.

With regard to another robot control device, in order to improve the behavior of the robot when it passes through a singular point, the robot control device proposes multiple improvement methods and receives a command from a user with regard to a choice in the multiple proposed methods to be used. Every time there is movement involving passing through the singular point, the user must give a command to the robot control device. When the user is not familiar with teaching a robot or its behavior, the command from the user is often not appropriate. Although a robot in which the rotation axis of the first arm member and the rotation axis of the second arm member are parallel to each other is also not assumed in the robot control device, it is desirable to improve the robot behavior while also taking into account user friendliness with regard to such a robot.

An articulated robot according to a first embodiment will be described below with reference to the drawings.

As shown in FIGS. 1 to 4, a horizontal articulated robot 1 according to this embodiment includes a base 100 fixed to a predetermined installation position 2 from below, and a first arm 10 having a proximal end supported by the base 100 in such a manner as to be rotatable around a first axis AX1 extending in the vertical direction. The robot 1 also includes a second arm 20 having a proximal end supported by a distal end of the first arm 10 in such a manner as to be rotatable around a second axis AX2 extending in the vertical direction, and a shaft 30 supported by a distal end of the second arm 20. The robot 1 is controlled by a robot control device 40. The robot control device 40 may be referred to as control device 40 in the description below.

As shown in FIGS. 1 to 4, the proximal end of the first arm 10 is attached to the base 100 from below, and the proximal end of the second arm 20 is attached to the distal end of the first arm 10 from below. A rotation center RC of the shaft 30, the first axis AX1, and the second axis AX2 are parallel to one another. The shaft 30 is supported by the second arm 20 in such a manner as to be movable in the vertical direction and rotatable around the rotation center RC extending in the vertical direction. A tool attachment flange 30a of the shaft 30 is disposed under the distal end of the second arm 20. Accordingly, the robot 1 according to this embodiment is a horizontal articulated robot that can be installed in a ceiling-suspended manner.

As shown in FIGS. 1 to 4, a first axis motor 11, such as a servo motor, for rotating the first arm 10 is disposed within the base 100, and a second axis motor 22, such as a servo motor, for rotating the second arm 20 is disposed within the first arm 10. Furthermore, a third axis motor 23, such as a servo motor, for moving the shaft 30 in the vertical direction and a fourth axis motor 24 for rotating the shaft 30 around the rotation center RC are disposed within the second arm 20.

The shaft 30 is supported by the distal end of the second arm 20 by using a ball screw nut and a ball spline nut that are not shown. Although such a structure will not be described in detail since it is well known, the ball screw nut is supported by the distal end of the second arm 20 in such a manner as to be rotatable around the rotation center RC, and the ball spline nut is also supported by the distal end of the second arm 20 in such a manner as to be rotatable around the rotation center RC. The ball screw nut and the ball spline nut are arranged in the vertical direction. The rotational force of the third axis motor 23 is transmitted to the ball screw nut via a belt (not shown), whereby the ball screw nut rotates. On the other hand, the rotational force of the fourth axis motor 24 is transmitted to the ball spline nut via a belt (not shown), whereby the ball spline nut rotates.

The shaft 30 is a ball screw spline shaft. The outer peripheral surface of the shaft 30 is provided with a helical ball screw groove (not shown) that engages with a metallic ball of the ball screw nut, and is also provided with a spline groove (not shown) that engages with a metallic ball of the ball spline nut.

Therefore, when the ball screw nut is rotated by the third axis motor 23, the shaft 30 moves in the vertical direction. When the ball spline nut is rotated by the fourth axis motor 24, the shaft 30 rotates around the rotation center RC.

Figure 5:
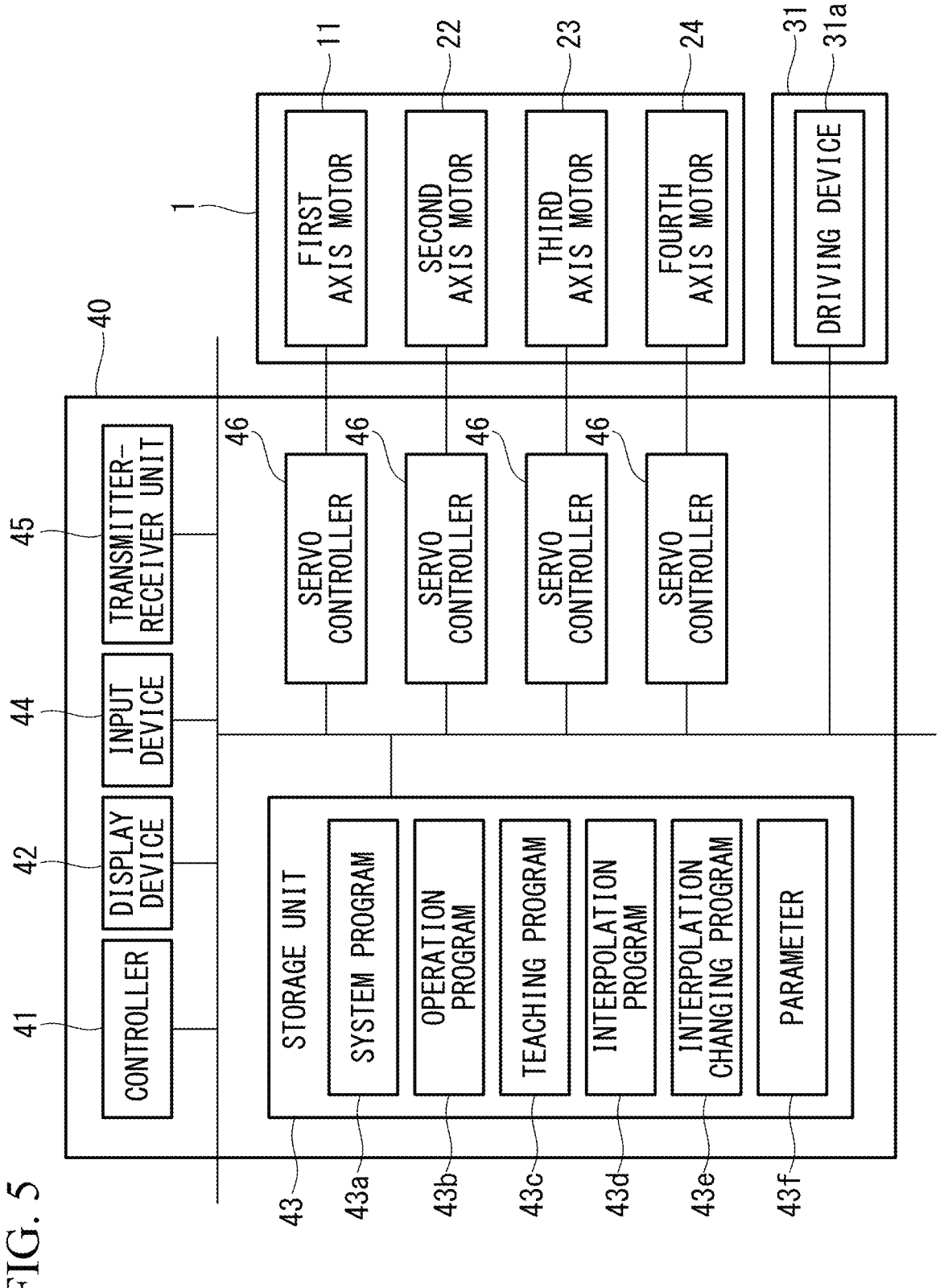
FIG. 5 is a block diagram of a control device of the articulated robot according to the first embodiment.

As shown in FIG. 5, the control device 40 includes: a processor 41 having at least one processor element, such as a CPU or a microprocessor; a display device 42; a storage unit 43 having a nonvolatile storage unit, a ROM, and a RAM; an input device 44, such as a keyboard, a liquid crystal display having a touchscreen function, a control panel, or a remote controller; a transmitter-receiver unit 45 for transmitting and receiving signals, and servo controllers 46 connected to the respective motors 11, 22, 23, and 24. The liquid crystal display having the touchscreen function may be, for example, a tablet computer, and the tablet computer owned by a user may function as the input device 44.

The storage unit 43 has a system program 43a stored therein. The system program 43a provides the basic function of the robot control device 40. The storage unit 43 also has an operation program 43b stored therein. The control device 40 transmits control commands for controlling the motors 11, 22, 23, and 24 to the servo controllers 46 based on the operation program 43b, and transmits a control command to a driving device 31a (FIG. 5) for a tool 31, such as a hand, attached to the tool attachment flange 30a at the lower end of the shaft 30. Accordingly, the robot 1 performs, for example, a process of picking a workpiece W.

Furthermore, the storage unit 43 has a teaching program 43c, an interpolation program 43d, and an interpolation changing program 43e stored therein.

In one example, based on the teaching program 43c, the robot control device 40 displays, on the display device 42 or a display unit of the input device 44, a screen for inputting teaching points of the robot 1, a screen for setting the interpolation type between the input teaching points, and a screen for displaying the input teaching points and the set interpolation type. The teaching points of the robot 1 can be input by a known method, such as direct teaching or inputting coordinate values.

In this embodiment, for example, as shown in FIG. 1, the position of each teaching point corresponds to the position of a flange center through which the rotation center RC passes in the tool attachment flange 30*a*, and the teaching point is input by using the input device 44. For example, multiple teaching points TB2, TB1, TA1, TA2, TA3, and TA4 are input, as shown in a screen example of FIG. 6. The multiple teaching points may be input from another computer. In either case, the processor 41 of the control device 40 receives each teaching point. A microprocessor integrally provided in the storage unit 43 may function as a part of the processor 41. In this embodiment, in the xy coordinate system described later, a tool center point (TCP) of the tool 31 is coincident with the center of the tool attachment flange 30*a* and the rotation center RC.

In this embodiment, the teaching point TA1 will be referred to as a first teaching point, the teaching point TA2 will be referred to as a second teaching point, the teaching point TA3 will be referred to as a third teaching point, and the teaching point TA4 will be referred to as a fourth teaching point.

The screen for setting the interpolation type displays, for example, a button for selecting linear interpolation, a button for selecting circular-arc interpolation, and a button for selecting multi-axis interpolation operation. When the user uses the input device 44 to select the interpolation method for each section, the selected interpolation type is received by the processor 41. The user can select the interpolation type by using another method, or the interpolation type may be input from another computer.

For example, in response to an input from the user, the processor 41 sets linear interpolation between the first teaching point TA1 and the second teaching point TA2, and sets linear interpolation between the second teaching point TA2 and the third teaching point TA3 as well as between the third teaching point TA3 and the fourth teaching point TA4. In the screen example in FIG. 6, each dashed line indicates that linear interpolation is set. Alternatively, the interpolation type may be indicated by using another method, such as by using a character or a symbol.

Figure 6:
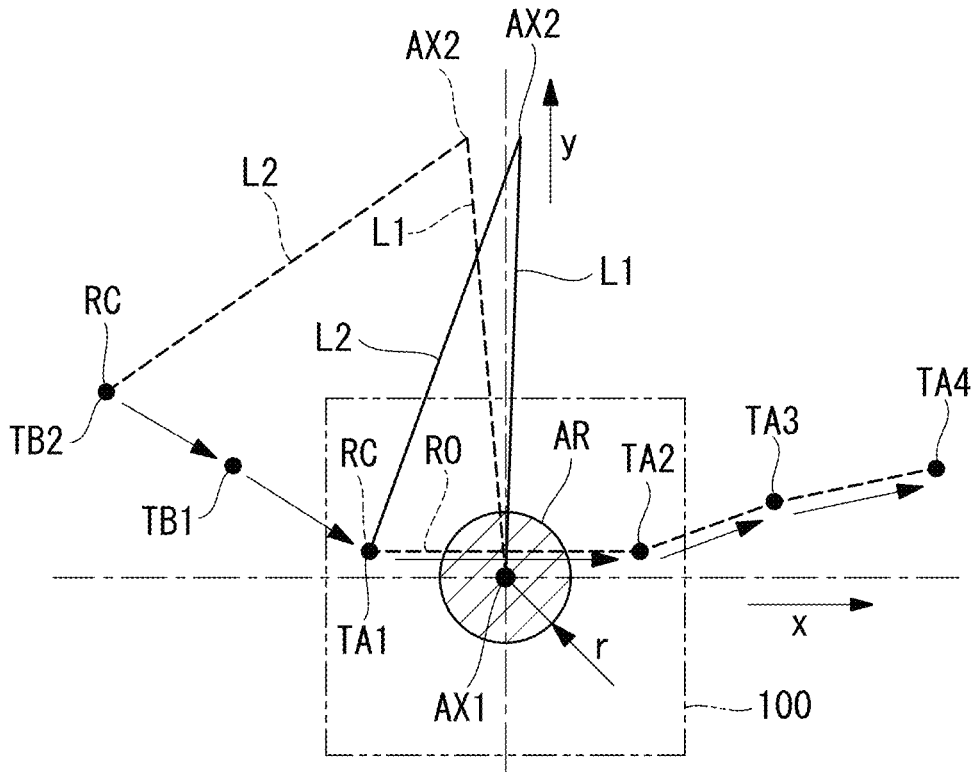
FIG. 6 is an example of display by a display device of the articulated robot according to the first embodiment.

Although the screen example in FIG. 6 displays the positions of the teaching points and the interpolation type within an xy two-dimensional space, the screen example may display the positions of the teaching points and the interpolation type within a three-dimensional space. As shown in FIG. 1 indicating an x-axis and a y-axis, an xy plane is orthogonal to the first axis AX1 and the second axis AX2. Each teaching point at least has coordinate data in the xy coordinate system, and each teaching point may have coordinate data in a z-direction orthogonal to the xy plane and rotational position data around the x-axis, y-axis, and z-axis. In this embodiment, each teaching point of the operation program 43*b* has coordinate data for positioning the rotation center RC of the robot 1 in the xy coordinate system at the teaching point.

In this embodiment, the screen example in FIG. 6 displays the position of the first arm 10, the position of the second arm 20, and the position of the rotation center RC of the shaft when the robot 1 moves to the position of the teaching point. In more detail, for example, a line component L1 indicating the link length of the first arm 10, a line component L2 indicating the link length of the second arm 20, the shape of the base 100, the position of the first axis AX1, the position of the second axis AX2, and the rotation center RC of the shaft 30 are displayed, which are recognized by the control device 40 during interpolation calculation. Figures of the first arm 10 and the second arm 20 may be illustrated in place of the line components L1 and L2. In this embodiment, the line component L1 and the line component L2 have the same length.

In this embodiment, linear interpolation involves continuously calculating the rotational positions of the first arm 10 and the second arm 20 in the xy coordinate system based on inverse kinematics by using, for example, the coordinate data of each teaching point, the lengths of the line components L1 and L2, a target movement speed of the position (predetermined position) of the rotation center RC, and a target movement acceleration of the position of the rotation center RC, and linearly moving the position (predetermined position) of the rotation center RC from a teaching point to another teaching point. For example, a known inverse Jacobian matrix is used for the calculation of linear interpolation. Another known calculation technique for linear interpolation may alternatively be used. The predetermined position is in the xy plane orthogonal to the second axis AX2 and may be regarded as a position corresponding to the distal end of the line component L2 indicating the link length of the second arm 20 recognized in the interpolation calculation.

In this embodiment, multi-axis interpolation operation involves moving the first arm 10 and the second arm 20 by interpolating a difference in the rotational positions thereof with an angular space between one teaching point (start point) and another teaching point (target point). The rotational position used at the start point and the rotational position used at the target point may be teaching points if the teaching points are directly designated based on the rotational positions of the arms, or may be calculated by using inverse transformation if the rotational positions are designated based on positions orthogonal to the distal ends of the arms.

Such interpolation may be regarded as calculation of point-to-point (PTP) control related to interpolation points.

The control device 40 may have a machine learning function, and the storage unit 43 may store therein a result obtained from machine learning. In these cases, the processor 41 controls the rotations of the first arm 10 and the second arm 20 by using the machine-learning result, and performs multi-axis interpolation operation involving moving the position of the rotation center RC in a non-linear-interpolation mode in the xy coordinate system. For example, it is conceivable that, for machine learning, the processor 41 moves the rotation center RC in the xy coordinate system along various routes passing through a predetermined area AR near a singular point, which will be described later. Then, it is possible to perform machine learning involving using an evaluation of the movement of the robot 1 when traveling along each route as learning data. It is also possible to perform machine learning involving using an evaluation of the movement of the first arm 10 when traveling along each route as learning data. Based on an output from a sensor, such as a camera, an acceleration sensor, or a force sensor, the processor 41 can perform the aforementioned evaluation. Based on the drive current of each of the motors 11 and 22 and the control contents, the processor 41 may calculate the movement and the acceleration of each of the first arm 10 and the second arm 20, and the processor 41 may perform the aforementioned evaluation based on the calculation result. Alternatively, the user may perform the evaluation and input the evaluation result by using the input device 44, and the processor 41 may associate each route and the input evaluation with each other.

The storage unit 43 stores therein a parameter 43$f$ defining the predetermined area AR in at least the xy coordinate system. For example, as shown in FIG. 6, in order to define the predetermined area AR having a radius r centered on the first axis AX1, the storage unit 43 stores therein positional coordinates of the first axis AX1 and a value of the radius r. The parameter 43$f$ may be of any type that can define the predetermined area AR, such as coordinate data of an outer edge of the predetermined area AR. When the predetermined area AR is displayed on the display device, as in the screen example in FIG. 6, the user can intuitively recognize a process, which is described later, of the control device 40 related to the predetermined area AR. In this embodiment, the radius r is 25% to 30% of the link length of the first arm 10, is preferably 40% of the link length or lower, and is more preferably 3% of the ling length or higher.

Because the line component L1 and the line component L2 have the same length in this embodiment, when the rotation center RC is coincident with the first axis AX1 in the xy coordinate system, the control of the moving robot 1 while performing calculation of linear interpolation becomes disturbed or impossible. In other words, the position of the first axis AX1 becomes a singular point. Alternatively, the position of the rotation center RC, when the line component L1 indicating the link length of the first arm 10 and the line component L2 indicating the link length of the second arm 20 are coincident with each other, becomes a singular point.

Figure 7:
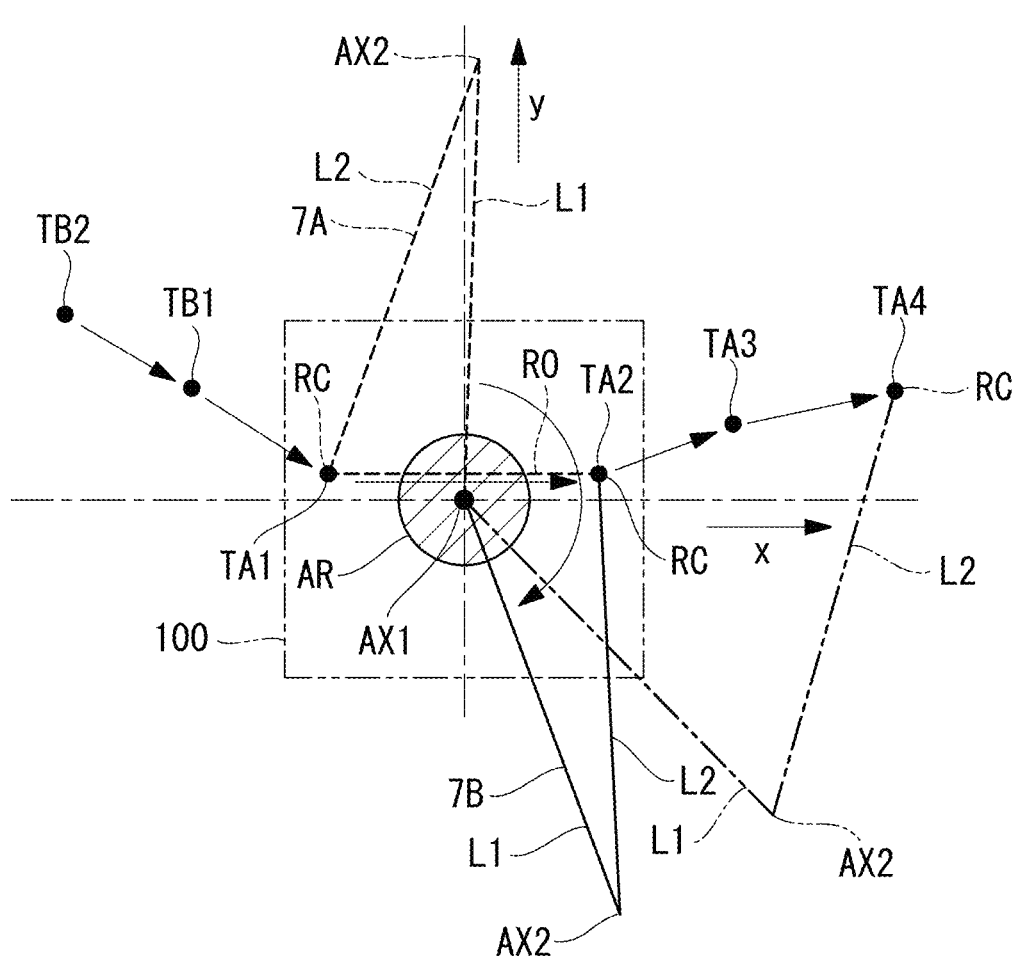
FIG. 7 illustrates an example of operation of the articulated robot.

For example, as shown in FIG. 7, when linear interpolation is used in the predetermined area AR which is set near a singular point, the first arm 10 moves largely at high speed, as indicated by an arrow in FIG. 7. Furthermore, the shorter the distance between the straight line and the singular point, the faster the speed becomes. Therefore, there is a case where a limiter of the robot 1 may be activated in response to this movement, which sometimes causes the robot 1 to stop suddenly. This movement does not give a good impression to the user, and may damage an accessory of the robot 1, the workpiece, or a surrounding item.

Figure 10:
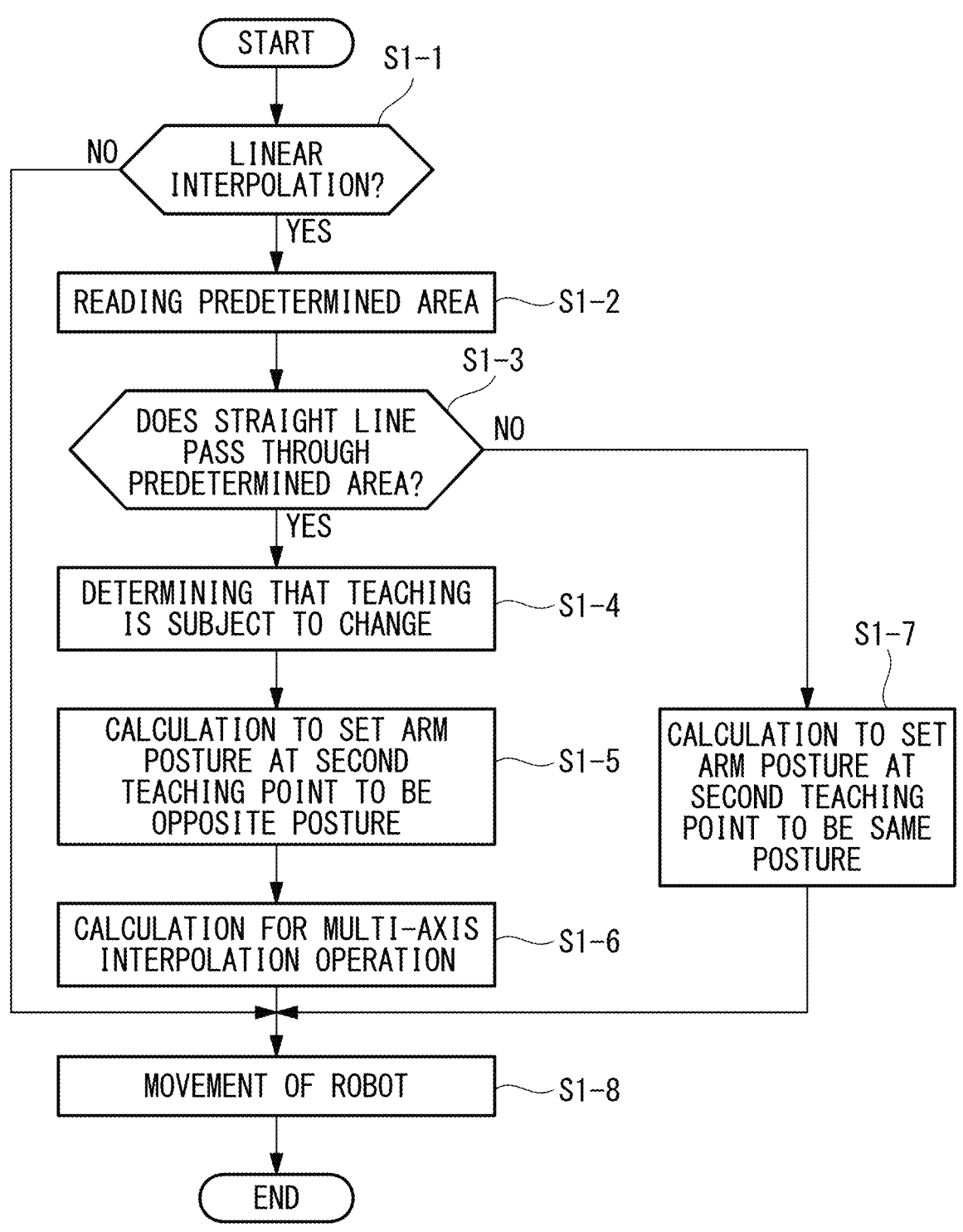
FIG. 10 is a flowchart of an example of a process performed by the control device of the articulated robot according to the first embodiment.

In this embodiment, after linear interpolation is designated between two teaching points, the control device 40 performs the following process while referring to the predetermined area AR at the time of operation of the robot 1 in a test mode, at the time of operation of the robot 1 for work, or at the time of preparation therefor. The operation of the control device 40 will now be described with reference to a flowchart in FIG. 10. The following description is a process related to the first teaching point TA1 and the second teaching point TA2, but a similar process is performed between teaching points of another pair.

The processor 41 performs the following process based on the interpolation changing program 43$e$. First, the processor 41 determines whether or not the interpolation type set between the first teaching point TA1 and the second teaching point TA2 is a linear interpolation (step S1-1). If the processor 41 determines that the interpolation type is a linear interpolation, the processor 41 reads the predetermined area AR stored as the parameter 43$f$ (step S1-2). Then, the processor 41 determines whether or not a straight line connecting the first teaching point TA1 and the second teaching point TA2 passes through the predetermined area AR (step S1-3), and determines that the teaching is subject to a change if the line passes through the predetermined area AR (step S1-4). In step S1-3, when the robot 1 moves along a route R0 in accordance with the linear interpolation, as in FIGS. 6 and 7, it is determined whether or not the rotation center RC passes through the predetermined area AR.

When it is determined that the teaching is subject to a change in step S1-4, the processor 41 calculates the rotational positions of the first arm 10 and the second arm 20 such that the arm posture at the second teaching point TA2 serving as a target position becomes an opposite posture of the arm posture at the first teaching point TA1 (step S1-5). Using this calculation result causes the arm posture of the robot 1 to become an arm posture R indicated with the dash line at the first teaching point TA1 and an arm posture L indicated with the solid line at the second teaching point TA2, as shown in, for example, FIG. 8. In other words, the arm posture of the robot 1 is changed before it reaches the second teaching point TA2. Accordingly, the rotational amount of the first arm 10 is reduced, as indicated by an arrow in FIG. 8.

Figure 2:
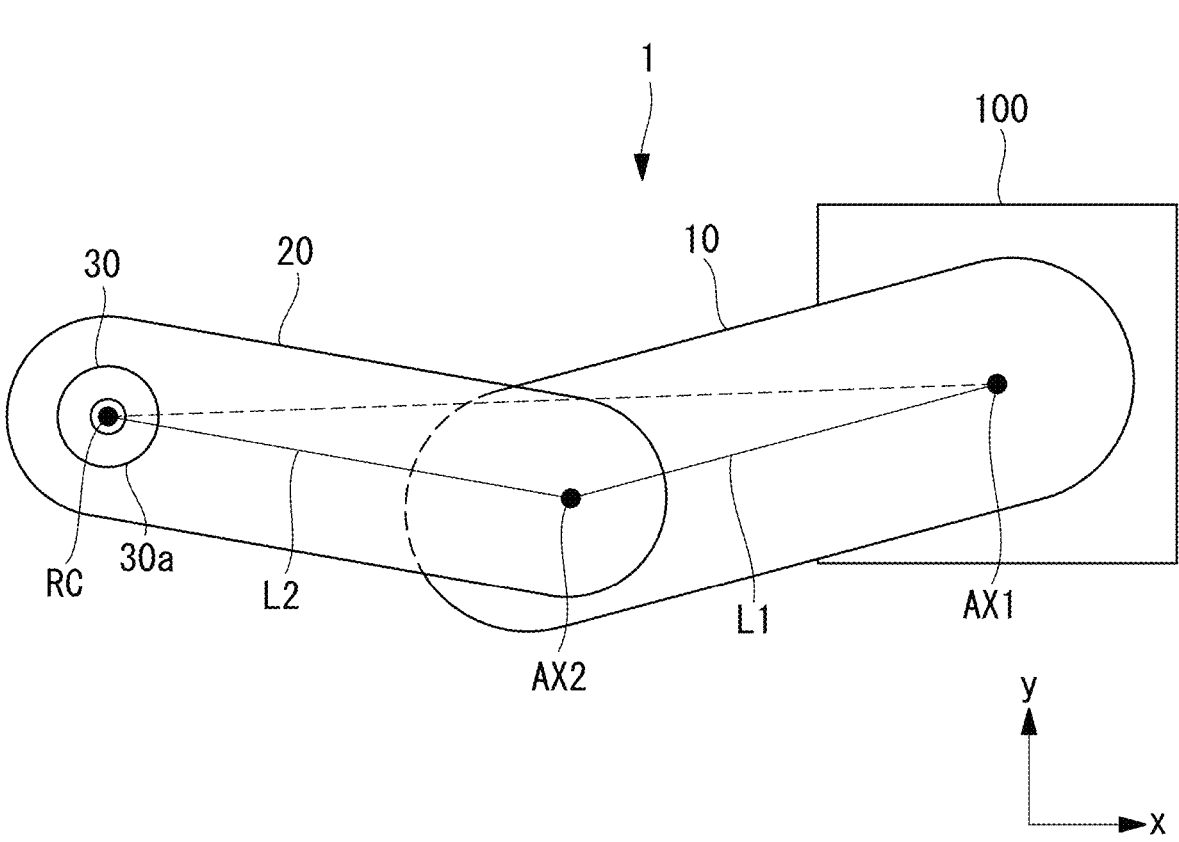
FIG. 2 is a plan view schematically illustrating the articulated robot according to the first embodiment.
Figure 3:
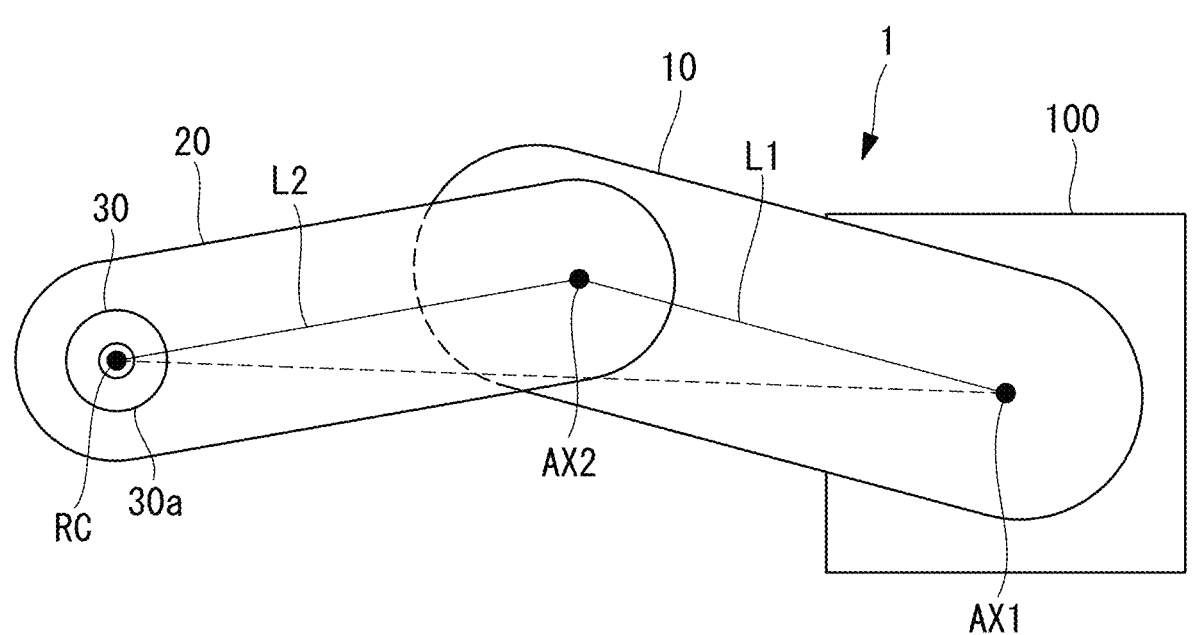
FIG. 3 is a plan view schematically illustrating the articulated robot according to the first embodiment.
Figure 4:
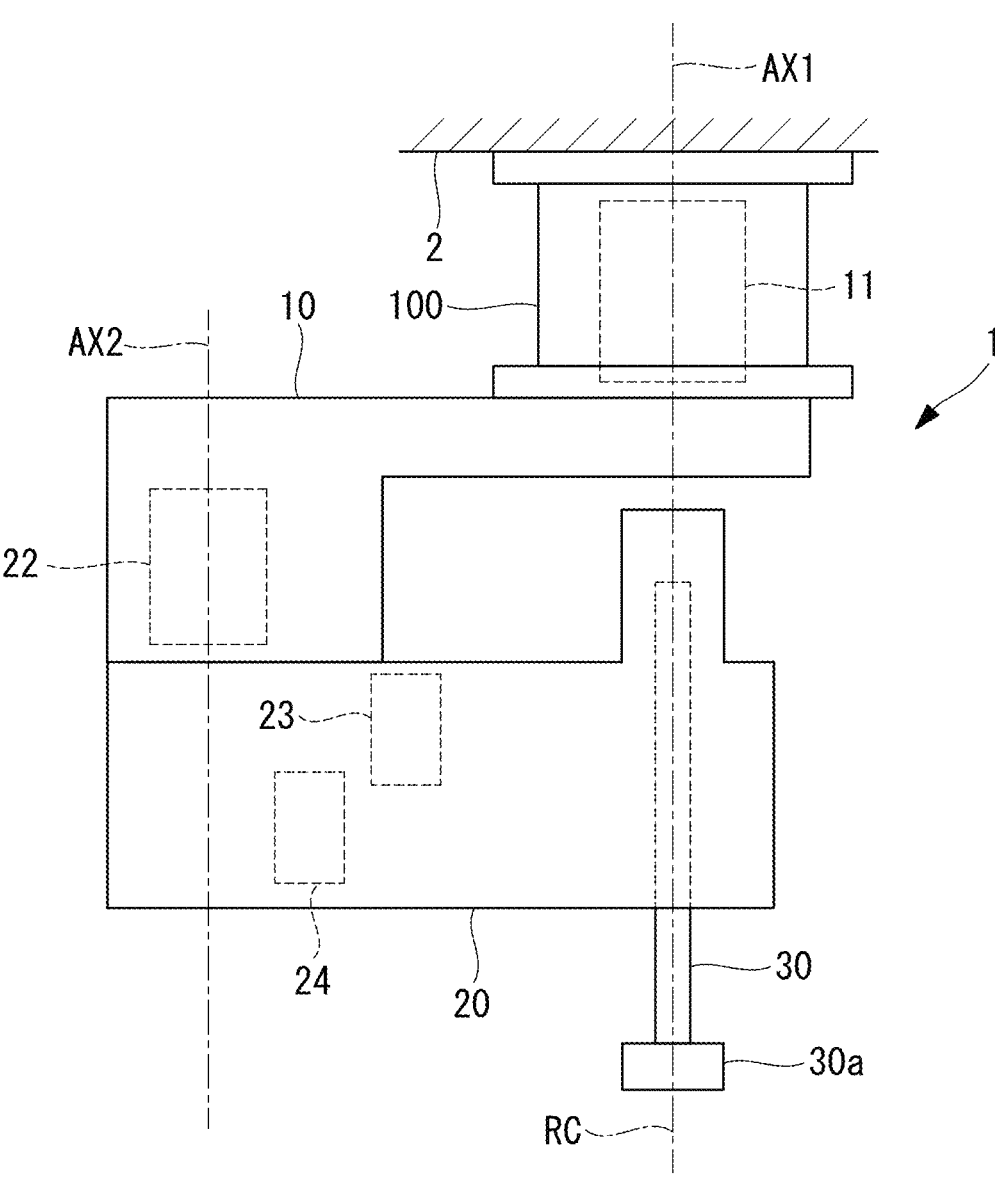
FIG. 4 is a side view schematically illustrating the articulated robot according to the first embodiment.

Each of the arm posture R and the arm posture L is an arm posture in plan view shown from a direction extending along a first axis AX of the robot 1. FIG. 2, FIG. 3, and FIGS. 6 to 9 are plan views of the robot 1 as viewed from below. Although the arm posture R or the arm posture L is defined in each of the plan views in this embodiment, it is also possible to define the arm posture in a plan view of the robot 1 as viewed from above. The arm posture R is a right arm posture. As shown in FIG. 3, the right arm posture is such that the second axis AX2 is disposed at a right side relative to the rotation center RC when viewed from the first axis AX1. The arm posture L is a left arm posture. As shown in FIG. 2, the left arm posture is such that the second axis AX2 is disposed at the side opposite from the right arm posture. Even when, for example, the rotational positions of the first arm 10 and the second arm 20 and the angle formed between the first arm 10 and the second arm 20 change, it is still possible to determine whether the arm posture is the arm posture R or the arm posture L based on the position of the second axis AX2.

Subsequently, the processor 41 automatically uses multi-axis interpolation operation different from the linear interpolation as the interpolation operation between the first teaching point TA1 and the second teaching point TA2, so as to calculate the operational positions of the first arm 10 and the second arm 20 for the multi-axis interpolation operation (step S1-6). Using this calculation result causes the rotation center RC to reach the second teaching point TA2 via, for example, a substantially circular-arc-like route R1, as shown in, for example, FIG. 8. In this embodiment, the circular-arc-like route R1 extends through the position of the first axis AX1.

Then, the processor 41 moves the first arm 10 and the second arm 20 by using the calculation results obtained in step S1-5 and step S1-6 based on the operation program 43$b$ (step S1-8).

On the other hand, if the aforementioned line does not pass through the predetermined area AR in step S1-3, the processor 41 calculates the rotational positions of the first arm 10 and the second arm 20 such that the arm posture at the teaching point serving as a target position becomes the same as the arm posture at the teaching point serving as a start position (step S1-7). Since it is not determined in step S1-7 that the teaching is subject to a change, a calculation based on linear interpolation is performed. For example, the process is performed between TA2 and TA3 and between TA3 and TA4 in FIG. 8. Then, based on the operation program 43$b$ and the interpolation program 43$d$, the processor 41 moves the first arm 10 and the second arm 20 in accordance with normal linear interpolation by using the calculation result obtained in step S1-7 (step S1-8).

If it is determined that the interpolation type is not linear interpolation in step S1-1, the processor 41 moves the first arm 10 and the second arm 20 in accordance with a designated interpolation method based on the operation program 43b and the interpolation program 43d (step S1-8).

Figure 9:
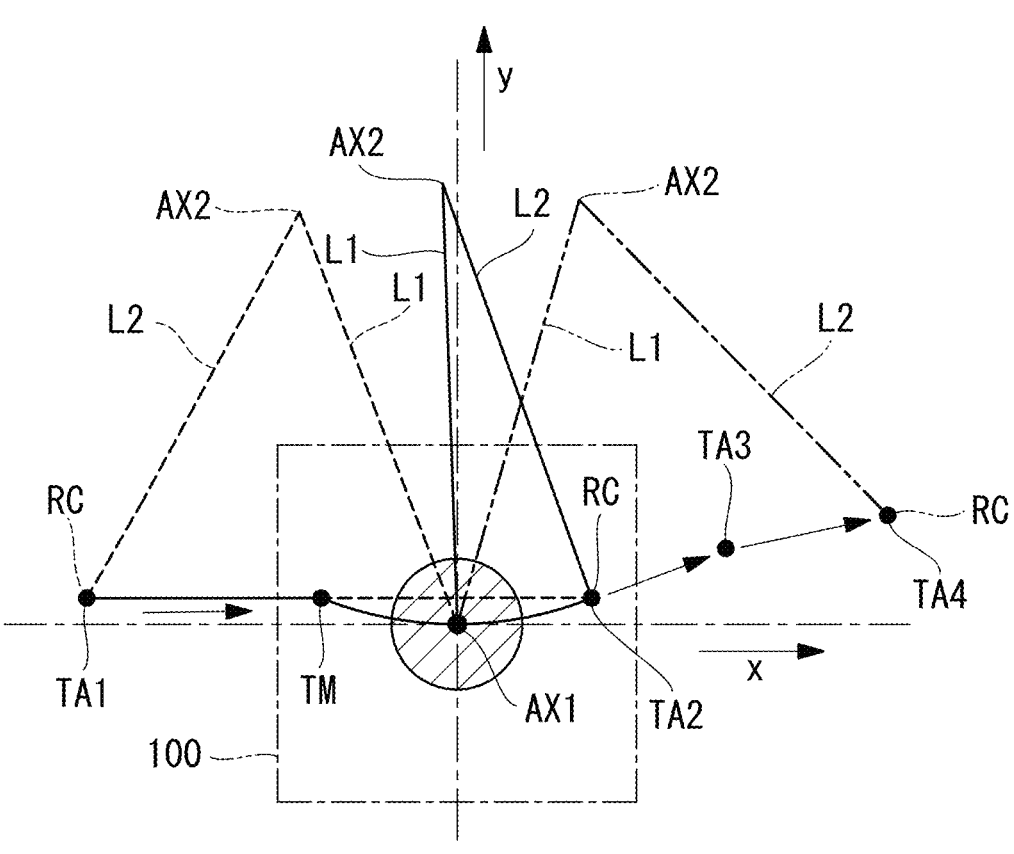
FIG. 9 is an example of display by the display device of the articulated robot according to the first embodiment.

It is conceivable that the processor 41 performs calculation for the multi-axis interpolation operation in step S1-6 for a section between the first teaching point TA1 and the second teaching point TA2 and performs calculation for the linear interpolation for the remaining section. For example, as shown in FIG. 9, it is possible for the processor 41 to add an intermediate teaching point TM between the first teaching point TA1 and the second teaching point TA2, perform linear interpolation calculation between the first teaching point TA1 and the intermediate teaching point TM, and perform calculation for multi-axis interpolation operation between the intermediate teaching point TM and the second teaching point TA2. In one example, the intermediate teaching point TM is added outside the predetermined area AR.

Figure 11:
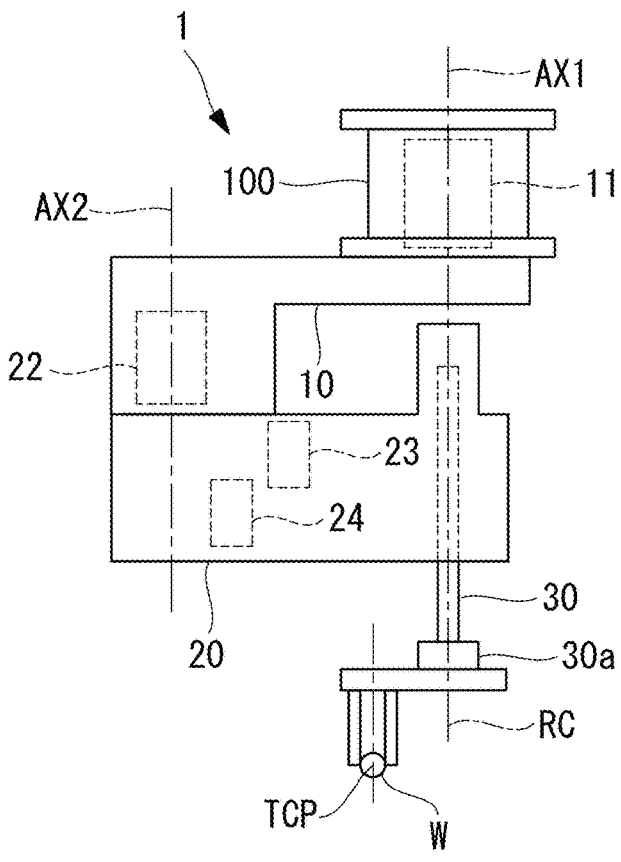
FIG. 11 is a side view schematically illustrating an articulated robot according to a second embodiment.

An articulated robot according to a second embodiment will be described below with reference to FIG. 11 to FIG. 13. As shown in FIG. 11, in the second embodiment, the TCP position of the tool 31 is offset from the rotation center RC in the xy coordinate system.

Similar to the first embodiment, in this configuration, after linear interpolation is designated between two teaching points, the control device 40 performs the following process while referring to the predetermined area AR at the time of operation of the robot 1 in the test mode, at the time of operation of the robot 1 for work, or at the time of preparation therefor. The operation of the control device 40 will now be described with reference to a flowchart in FIG. 13. The following description relates to a process related to the first teaching point TA1 and the second teaching point TA2, but a similar process is performed between teaching points of another pair. In the second embodiment, each teaching point indicates the TCP position.

The processor 41 performs the following process based on the interpolation changing program 43e. First, the processor 41 determines whether or not the interpolation type set between the first teaching point TA1 and the second teaching point TA2 is linear interpolation (step S2-1). If the processor 41 determines that the interpolation type is linear interpolation, the processor 41 reads the predetermined area AR stored as the parameter 43f (step S2-2). Then, the processor 41 determines whether or not the rotation center RC passes through the predetermined area AR (step S2-3), and determines that the teaching is subject to a change if the rotation center RC passes through the predetermined area AR (step S2-4).

Figure 12:
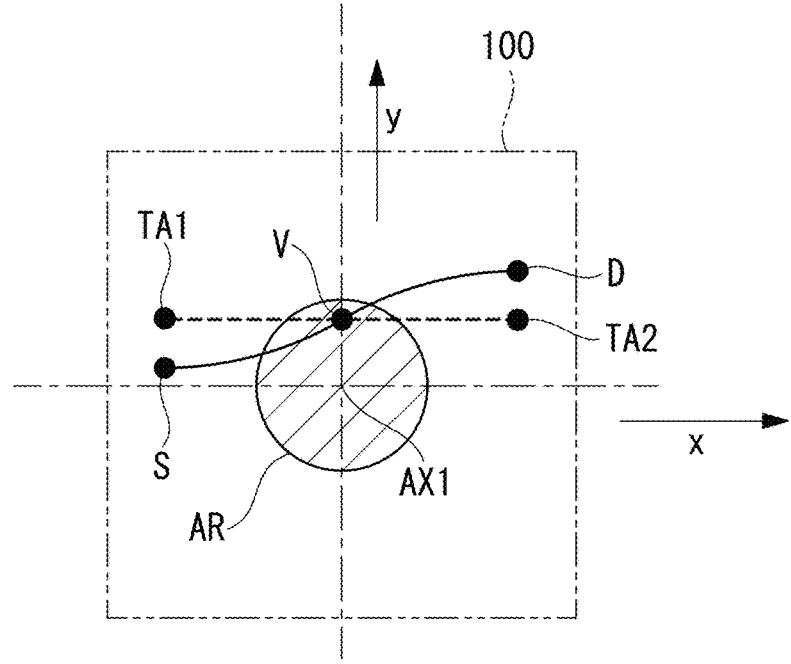
FIG. 12 illustrates an example of operation of the articulated robot according to the second embodiment.
Figure 13:
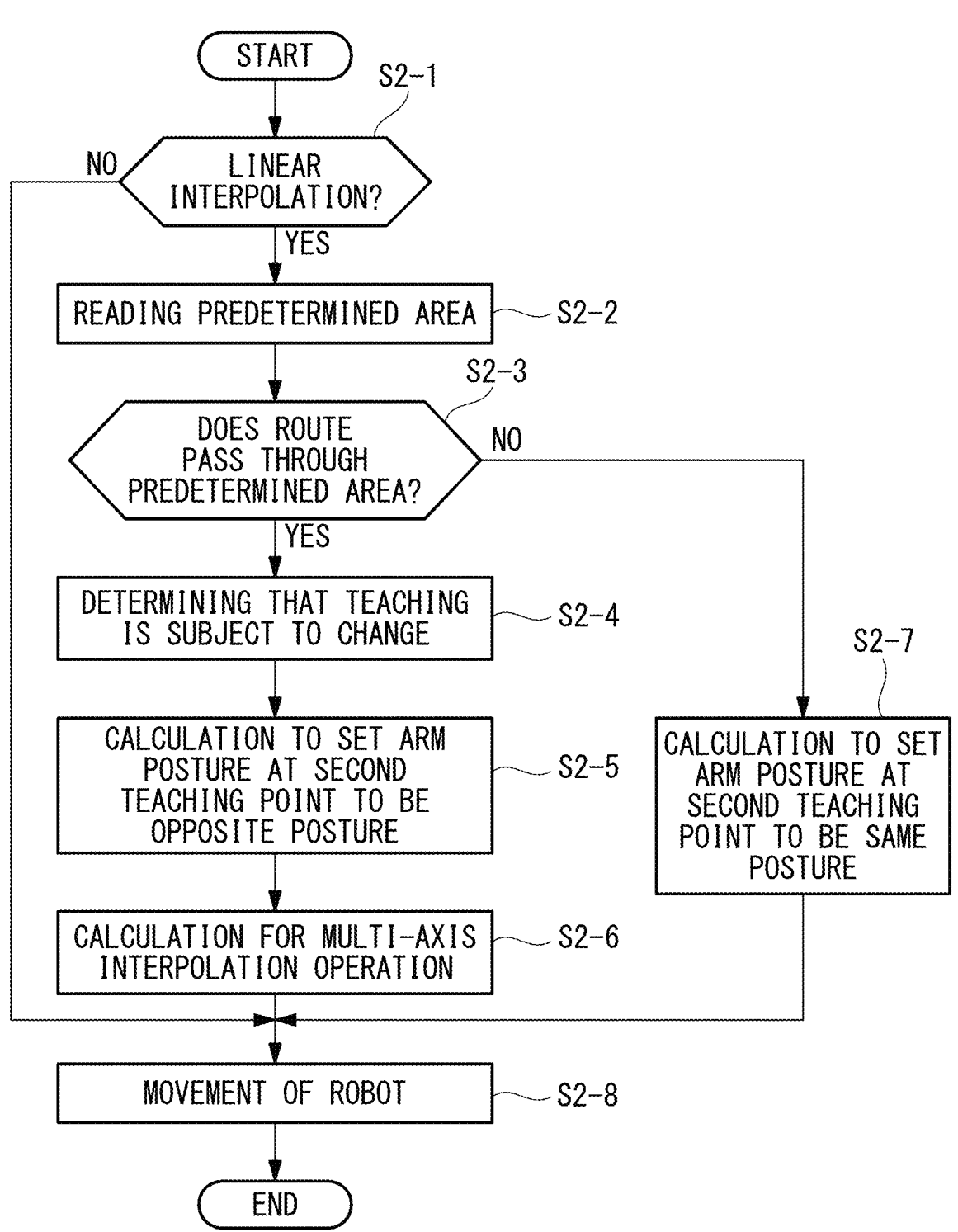
FIG. 13 is a flowchart of an example of a process performed by a control device of the articulated robot according to the second embodiment.

In step S2-3, the processor 41 determines whether or not the trajectory of the rotation center RC passes through the predetermined area AR when the robot 1 moves from the first teaching point TA1 to the second teaching point TA2, as shown in FIG. 12. Depending on the rotational positions of the shaft 30 at the first teaching point TA1 and the second teaching point TA2, the trajectory of the rotation center RC is sometimes not linear, as in a curved path from S to D shown in FIG. 12. Therefore, the processor 41 may determine whether or not the rotation center RC passes through the predetermined area AR by using the route of the rotation center RC obtained in the calculation of linear interpolation from the first teaching point TA1 to the second teaching point TA2, or may calculate a position V of the rotation center RC at an arbitrary passing point from the first teaching point TA1 to the second teaching point TA2 and approximately determine whether or not a line component SV or a line component VD passes through the predetermined area AR.

Subsequently, step S2-5 to step S2-8 that are similar to step S1-5 to step S1-8 in the first embodiment are executed.

It is conceivable that the robot 1 has a distal-end arm that rotates around the rotation center RC at the distal end of the second arm 20 in place of the shaft 30, and another arm may further be rotatably supported by the distal end of the distal-end arm. Teaching points may be set with respect to and the distal end of the distal-end arm another arm. In these cases, the processor 41 is capable of performing the above-described process according to the second embodiment. In other words, as in the above description of the second embodiment, the processor 41 can determine whether or not the rotation center RC passes through the predetermined area AR by using the route of the rotation center RC obtained in the calculation of linear interpolation from the first teaching point TA1 to the second teaching point TA2.

Figure 14:
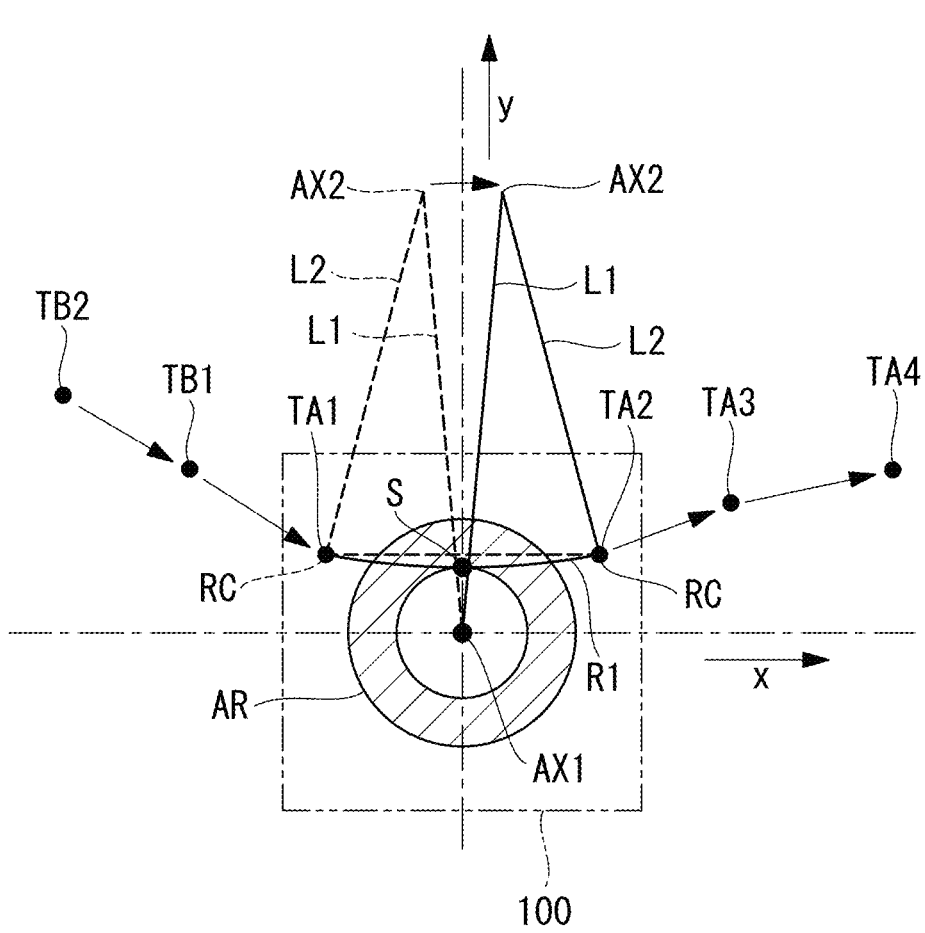
FIG. 14 illustrates an example of operation of an articulated robot according to a modification of the first embodiment.

In the first embodiment and the second embodiment, the line component L1 and the line component L2 may have different lengths. For example, the position of the rotation center RC when the line component L1 and the line component L2 are aligned with each other, as shown in FIG. 14, serves as a singular point. Even in this case, the predetermined area AR can be defined near the singular point, and the control device 40 can perform a process similar to that in each of the first embodiment and the second embodiment while referring to the predetermined area AR. In FIG. 14, linear interpolation is set between the first teaching point TA1 and the second teaching point TA2 in the specifications of the robot 1 according to the first embodiment, and a line connecting the first teaching point TA1 and the second teaching point TA2 passes through the predetermined area AR. Therefore, step S1-5 and step S1-6 in the first embodiment are executed, and the rotation center RC reaches the second teaching point TA2 via, for example, the substantially circular-arc-like route R1. Although the line component L2 is shorter than the line component L1 in FIG. 14, the same applies to a case where the line component L2 is longer than the line component L1.

In each of the above embodiments, the parameter 43f defining the predetermined area AR near a singular point is stored in the storage unit 43. Moreover, when the interpolation type is linear interpolation and when the teaching that involves the rotation center RC (predetermined position) passing through the predetermined area AR is subject to a change during movement of the robot 1 in accordance with linear interpolation from the first teaching point TA1 toward the second teaching point TA2, the processor 41 of the control device 40 automatically uses multi-axis interpolation operation different from the linear interpolation for at least a part of the interpolation operation between the first teaching point TA1 and the second teaching point TA2. Therefore, even when the user designates linear interpolation near a singular point, the first arm 10 and the second arm 20 move smoothly. In an environment where there are many users who are not used to teaching robots, the above technology contributes to enhanced user friendliness of robots and to improved working efficiency for users.

In each of the above embodiments, when the teaching is subject to a change, the processor 41 controls the first arm 10 and the second arm 20 such that the arm posture at the first teaching point TA1 is one of the right arm posture and the left arm posture and that the arm posture when the second teaching point TA2 is reached is the other one of the right arm posture and the left arm posture. By using this technology together with the automatic application of the above-described multi-axis interpolation operation, the first arm 10 and the second arm 20 move more smoothly even when the user designates linear interpolation near a singular point. In particular, this contributes to prevention of unnecessary rotation of the first arm 10.

In each of the above embodiments, in a case where the rotation center RC (predetermined position) does not pass through the predetermined area AR when the robot 1 moves in accordance with linear interpolation, if the arm posture is one of the right arm posture and the left arm posture at the first teaching point TA1 in the linear interpolation, the processor 41 controls the first arm 10 and the second arm 20 such that the arm posture when the second teaching point TA2 is reached becomes the one posture.

In each of the above embodiments, the display device 42 or the display unit of the input device 44 may display that an interpolation changing process has been performed. In one example, the route R1 of the rotation center RC (predetermined position) for the multi-axis interpolation operation is displayed between the first teaching point TA1 and the second teaching point TA2, as in the screen example shown in FIG. 8. Accordingly, the user can recognize how the rotation center RC (predetermined position) moves in a section where linear interpolation is designated. In particular, since the details of the multi-axis interpolation operation are displayed in the case of FIG. 8, the user can recognize the movement of the rotation center RC (predetermined position) in more detail, and can intuitively recognize that there is a route diagram.

Another example involves displaying that an interpolation changing process has been performed between the first teaching point TA1 and the second teaching point TA2. Yet another example involves displaying that the section between the first teaching point TA1 and the second teaching point TA2 becomes a circular-arc trajectory in accordance with an interpolation changing process.

Figure 8:
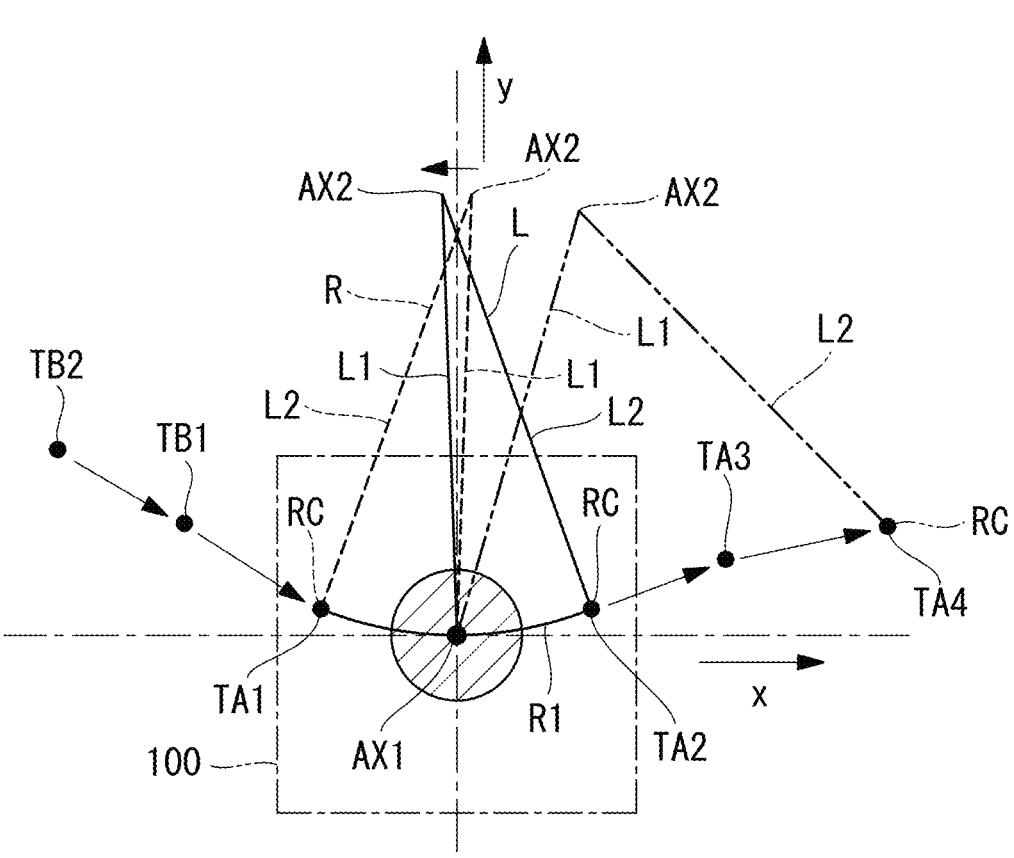
FIG. 8 is an example of display by the display device of the articulated robot according to the first embodiment.

Furthermore, in each of the above embodiments, the arm posture at each of the first teaching point TA1 and the second teaching point TA2 is displayed on the display device 42 or the display unit of the input device 44. In one example, the line component L1 and the line component L2 are displayed by using a dash line and a solid line, as in the screen example shown in FIG. 8, so that the user can intuitively recognize the arm posture at each teaching point. In FIG. 8, the line component L1 and the line component L2 may be displayed for all teaching points. Moreover, in FIG. 8, instead of displaying the line component L1 and the line component L2, characters, symbols, or figures indicating the R and L arm postures may be displayed alongside all or some of the teaching points. In this case, similar advantages are exhibited.

In each of the above embodiments, the robot 1 is installed in a ceiling-suspended manner such that the base 100 thereof is fixed to a predetermined installation position from below. Alternatively, the base 100 of the robot 1 may be fixed to a vertically-extending wall from the horizontal direction, or the base 100 of the robot 1 may be fixed to a floor surface from above.

The invention claimed is:

1. A robot control device comprising a processor and a storage unit, the robot control device controlling a horizontal articulated robot having a first arm supported by a base and a second arm supported by the first arm, wherein the storage unit stores a parameter defining a predetermined area near a singular point of the horizontal articulated robot, wherein the processor is configured to perform:

a first teaching point process that receives a first teaching point for movement of the horizontal articulated robot;

a second teaching point process that receives a second teaching point serving as a passing point after the first teaching point;

an interpolation type process that receives an interpolation type to be applied between the first teaching point and the second teaching point; and an interpolation changing process that automatically uses multi-axis interpolation operation different from linear interpolation for at least a part of interpolation operation between the first teaching point and the second teaching point when the interpolation type is the linear interpolation and also when there is a teaching in which a predetermined position of a distal end of the second arm passes through the predetermined area during movement of the horizontal articulated robot in accordance with the linear interpolation from the first teaching point to the second teaching point and therefore the teaching is subject to a change;

wherein the robot control device further comprises a display device displaying that the interpolation changing process is performed.

2. The robot control device according to claim 1, wherein the predetermined position is a position of a rotation center of a shaft supported by the distal end of the second arm.

3. The robot control device according to claim 1, wherein, when the teaching is subject to the change, the processor controls the first arm and the second arm such that an arm posture formed by the first arm and the second arm is one of a right arm posture and a left arm posture at the first teaching point and that the arm posture at the second teaching point is changed to the other one of the right arm posture and the left arm posture.

4. The robot control device according to claim 3, further comprising a display device displaying the arm posture at each of the first teaching point and the second teaching point.

5. The robot control device according to claim 1, wherein in a case where the predetermined position does not pass through the predetermined area during the movement of the horizontal articulated robot in accordance with the linear interpolation between the first teaching point and the second teaching point, and when an arm posture formed by the first arm and the second arm is one of a right arm posture and a left arm posture at the first teaching point, the processor controls the first arm and the second arm such that the arm posture at the second teaching point is the one of the right arm posture and the left arm posture.

6. The robot control device according to claim 1, further comprising a display device displaying a detail of the multi-axis interpolation operation when the interpolation changing process is performed.

7. An articulated robot comprising:

a first arm having a proximal end supported by a base to be rotatable around a first axis;

a second arm supported by a distal end of the first arm to be rotatable around a second axis parallel to the first axis; and a robot control device configured to control a rotational position of the first arm around the first axis and a rotational position of the second arm around the second axis, wherein a storage unit of the robot control device stores a parameter defining a predetermined area near a singular point of the articulated robot, wherein a processor of the robot control device is configured to perform:

a first teaching point process that receives a first teaching point;

a second teaching point process that receives a second teaching point serving as a passing point after the first teaching point;

an interpolation type process that receives an interpolation type to be applied between the first teaching point and the second teaching point; and an interpolation changing process that automatically uses multi-axis interpolation operation different from linear interpolation for at least a part of interpolation operation between the first teaching point and the second teaching point when the interpolation type is the linear interpolation and also when there is a teaching in which a predetermined position of a distal end of the second arm passes through the predetermined area during movement of the horizontal articulated robot in accordance with the linear interpolation from the first teaching point to the second teaching point and therefore the teaching is subject to a change;

wherein the robot control device further comprises a display device displaying that the interpolation changing process is performed.

8. The articulated robot according to claim 7, wherein the predetermined position is a position that is located in a plane orthogonal to the second axis and that corresponds to a distal end of a line component indicating a link length of the second arm recognized in an interpolation calculation.

9. The articulated robot according to claim 7, wherein, when the teaching is subject to the change, the processor controls the first arm and the second arm such that an arm posture formed by the first arm and the second arm at the first teaching point is one of a right arm posture and a left arm posture and that the arm posture at the second teaching point is changed to the other one of the right arm posture and the left arm posture.

10. The articulated robot according to claim 7, wherein in a case where the predetermined position does not pass through the predetermined area during the movement of the articulated robot in accordance with the linear interpolation between the first teaching point and the second teaching point, and when an arm posture formed by the first arm and the second arm is one of a right arm posture and a left arm posture at the first teaching point, the first arm and the second arm are controlled such that the arm posture at the second teaching point is the one of the right arm posture and the left arm posture.

* * * * *